United States Patent
Zoellner et al.

(10) Patent No.: US 9,031,173 B2
(45) Date of Patent: May 12, 2015

(54) RECEIVING APPARATUS AND METHOD

(75) Inventors: Jan Zoellner, Braunschweig (DE); Nabil Sven Loghin, Freiburg (DE); Lothar Stadelmeier, Stuttgart (DE); Joerg Robert, Vreden (DE)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/009,194

(22) PCT Filed: Mar. 12, 2012

(86) PCT No.: PCT/EP2012/054233
§ 371 (c)(1),
(2), (4) Date: Jan. 9, 2014

(87) PCT Pub. No.: WO2012/136445
PCT Pub. Date: Oct. 11, 2012

(65) Prior Publication Data
US 2014/0112420 A1    Apr. 24, 2014

(30) Foreign Application Priority Data
Apr. 8, 2011 (EP) .................................. 11161773

(51) Int. Cl.
*H04L 1/00* (2006.01)
*H04L 27/26* (2006.01)

(52) U.S. Cl.
CPC .......... *H04L 27/2649* (2013.01); *H04L 1/0023* (2013.01); *H04L 1/0028* (2013.01); *H04L 27/261* (2013.01)

(58) Field of Classification Search
USPC .................. 375/343, 260, 267, 347
See application file for complete search history.

(56) References Cited

U.S. PATENT DOCUMENTS

| 7,801,088 | B2* | 9/2010 | Kim et al. ..................... 370/335 |
| 2008/0002780 | A1* | 1/2008 | Yu et al. ....................... 375/267 |
| 2010/0085985 | A1 | 4/2010 | Pekonen et al. |
| 2011/0044393 | A1* | 2/2011 | Ko et al. ....................... 375/260 |
| 2011/0268037 | A1* | 11/2011 | Fujimoto ....................... 370/328 |

OTHER PUBLICATIONS

ETSI EN 302 755 V1.1.1, "Digital Video Broadcasting (DBV); Frame structure channel coding and modulation for a second generation digital terrestrial television broadcasting system (DVB-T2)," Digital Video Broadcasting, pp. 1-167, (Sep. 2009) XP 002635196.
International Search Report Issued Jun. 4, 2012 in PCT/EP12/054233 Filed Mar. 12, 2012.

* cited by examiner

*Primary Examiner* — Kabir A Timory
(74) *Attorney, Agent, or Firm* — Oblon, McClelland, Maier & Neustadt, L.L.P.

(57) ABSTRACT

A receiving apparatus for receiving signals in a transmission system transmitted based on a frame structure including signaling data and payload data. The receiving apparatus includes a receiver configured to receive a transmission signal, a frame demapper configured to demap signaling data blocks and payload data patterns from the frames of the frame structure of the received transmission signal, wherein a signaling data block is assumed to include a number of data corresponding to a number of a signaling data pattern, wherein the signaling data patterns are split into n signaling data portions, n being a positive integer, in which n signaling portions are mapped onto n or less frames, and a demodulation decoder is configured to separately demodulate and decode the signaling data blocks and payload data patterns to obtain signaling data and payload data.

20 Claims, 8 Drawing Sheets

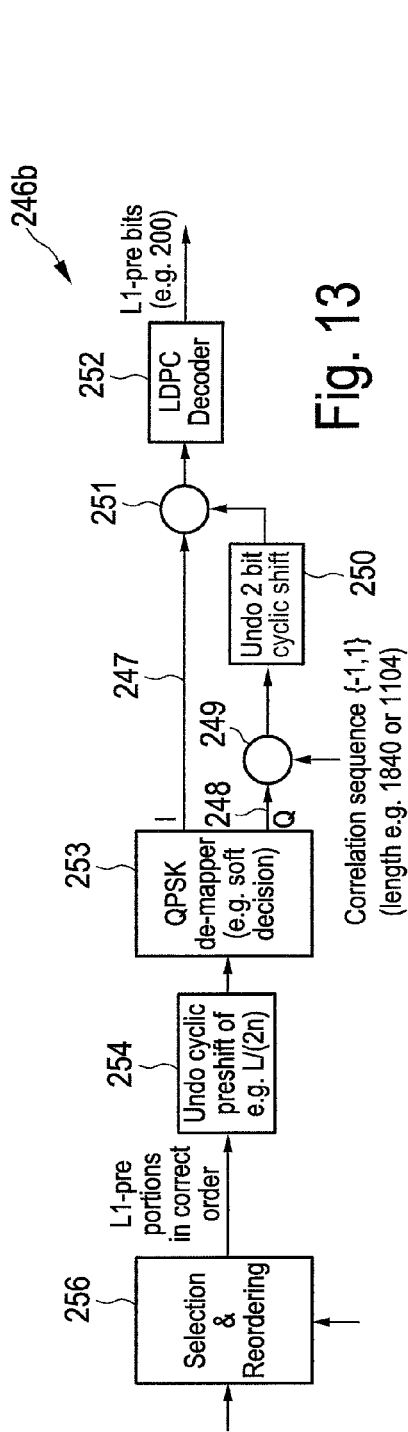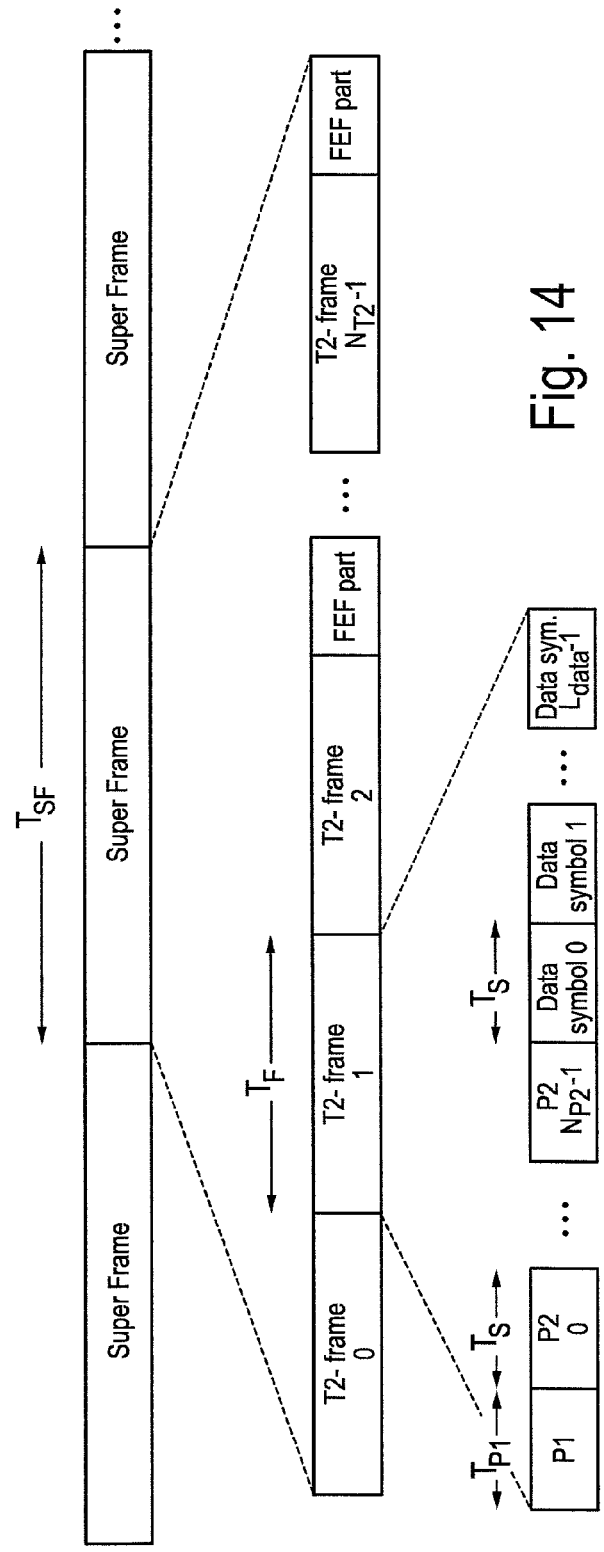

RECEIVING APPARATUS AND METHOD

CROSS-REFERENCE TO RELATED APPLICATIONS

The present application claims priority of EP patent application No. 11 161 773.4 filed on 8 Apr. 2011, the entire contents of which are incorporated herein by reference.

FIELD OF THE INVENTION

The present invention relates to a receiving apparatus and a corresponding method for receiving signals in a transmission system, said signals being transmitted on the basis of a frame structure, the frames of said frame structure comprising signaling data and payload data. Further, the present invention relates to a signaling data demodulation decoder and a corresponding demodulation decoding method for use in such a transmitting apparatus and transmitting method, respectively. Even further, the present invention relates to a computer program and a computer readable non-transitory medium.

BACKGROUND OF THE INVENTION

The signaling of DVB-T2 (Digital Video Broadcasting—T2, as described in ETSI EN 302 755 V1.1.1 (2009-09) "Digital Video Broadcasting (DVB); Frame structure channel coding and modulation for a second generation digital terrestrial television broadcasting system (DVB-T2)") contains many signaling fields which are static during the transmission. For instance, the contents of L1-pre and L1-config can only change per superframe, which typically consists of several T2 frames, or even do not change at all for quite a long time (e.g. several weeks or months).

This way of transmitting signaling data in a transmission system, in particular in a broadcasting system for mobile reception of broadcast transmissions, requires a certain amount of bandwidth and transmission power as well as reception power of receiving apparatus (e.g. mobile handheld devices) which contravenes the general requirements of such broadcast systems for mobile reception.

BRIEF SUMMARY OF THE INVENTION

It is an object of the present invention to provide a receiving apparatus and a corresponding receiving method which enable a transmitting apparatus to save transmission bandwidth and transmission power and which provide a sufficient robustness for reliable detection by the receiving apparatus (e.g. mobile handheld devices).

It is a further object of the present invention to provide a signaling data demodulation decoder and a corresponding demodulation decoding method for use in such a receiving apparatus and receiving method, respectively. Further, it is an object of the present invention to provide a corresponding computer program for implementing said method and a computer readable non-transitory medium storing such a computer program.

According to an aspect of the present invention there is provided a receiving apparatus for receiving signals in a transmission system, said signals being transmitted on the basis of a frame structure, the frames of said frame structure comprising signaling data and payload data, said receiving apparatus comprising:
a receiver configured to receive a transmission signal,
a frame demapper configured to demap signaling data blocks and payload data patterns from the frames of said frame structure of said received transmission signal, wherein a signaling data block is assumed to comprise a number of data corresponding to the number of a signaling data pattern, wherein said signaling data patterns are split into n signaling data portions, n being a positive integer, which n signaling portions are mapped onto n or less frames, and
a demodulation decoder configured to separately demodulate and decode said signaling data blocks and payload data patterns to obtain signaling data and payload data, wherein said demodulation decoder comprises a signaling data demodulation decoder configured to demodulate and decode said signaling data blocks by determining the number n from said signaling blocks by performing a correlation of the data included in one or more signaling data blocks with the correlation sequence, by which the signaling data have been correlated before transmission, and decoding n signaling portions included in the signaling blocks from which n has been determined.

According to a further aspect of the present invention there is provided a corresponding signaling data demodulation decoder for use in a transmitting apparatus according to the present invention, said signaling data demodulation decoder being configured to demodulate and decode said signaling data blocks and comprising
i) a demodulation unit configured to demodulate encoded signaling data included in one or more signaling data blocks and to output the demodulated signaling data on a first path and on a second path having a different phase than the first path,
ii) a sorting unit provided on the first path and configured to sort the demodulated signaling data,
iii) a combining unit provided on the first path and configured to combine said demodulated signaling data of the second path with said resorted signaling data,
iv) a correlation unit configured to correlate said combined signaling data with said correlation sequence, and
v) a detection unit configured to determine the value of n, and
vi) a decoding unit configured to decode said n signaling portions included in the signaling blocks from which n has been determined.

According to still further aspects corresponding methods and a computer program comprising program means for causing a computer to carry out the steps of the signaling data demodulation decoding method according to the present invention, when said computer program is carried out on a computer, as well as a computer readable non-transitory medium having instructions stored thereon which, when carried out on a computer, cause the computer to perform the steps of the signaling data demodulation decoding method according to the present invention are provided.

Preferred embodiments of the invention are defined in the dependent claims. It shall be understood that the claimed signaling data demodulation decoder, the claimed methods, the claimed computer program and the claimed computer readable medium have similar and/or identical preferred embodiments as the claimed receiving apparatus and as defined in the dependent claims.

The present invention is based on the idea to split the signaling data patterns into smaller signaling portions in order to reduce the signaling overhead and to increase the robustness by means of additional time diversity. In other words, in each frame not the complete signaling data pattern is transmitted as is currently done in transmission system in accordance with DVT-T2, but less signaling data need to be transmitted in each data frame. The receiver collects the signaling data from several frames and appropriately combines them to obtain the complete signaling data pattern.

The number of signaling data portions into which a signaling pattern is split may be predetermined and fixed so that both the transmitting devices and the receiving devices know this number. However, it is also possible that this number is set individually, e.g. by the operator of the transmitting device (e.g. a broadcaster), or is determined on the fly, for instance to achieve a desired time diversity. In this case this number is either signaled from the transmitting device to the receiving devices or the receiving devices are provided with means for retrieving this number from the received signaling data itself or in any other way, as is proposed according to the present invention.

Generally, the n signaling data portions are mapped onto n different (preferably subsequent) frames. However it is also possible to map the n signaling data portions onto less than n different frames, e.g. to map two or more signaling data portion onto the same frame (at adjacent or separate positions of the same frame), or to map the n signaling data portions onto n different frames which are not arranged adjacent to each other.

The proposed receiving device is enabled to determine this number for which purpose the signaling data are linked with a correlation sequence in the transmitting device. By use of the same correlation sequence in the receiving device it is then possible to detect the number of signaling data portions and, generally, the position of a received signaling data portion in the complete signaling pattern, even if this information is not separately signaled or otherwise available to the receiving device.

The receiving apparatus according to the present invention can be used in a transmission system including one or more transmitting apparatus and one or more receiving apparatus. A transmitting apparatus is preferably configured for transmitting signals in a transmission system on the basis of a frame structure, the frames of said frame structure comprising signaling data and payload data, said transmitting apparatus comprising:
  a modulation encoder configured to separately modulate and encode said signaling data into signaling data patterns and said payload data into payload data patterns,
  a frame builder configured to map the signaling data patterns and payload data patterns onto the frames of said frame structure of a transmission signal, wherein said signaling data patterns are split into n signaling data portions, n being a positive integer, which n signaling portions are mapped onto n or less frames, and
  a transmitter configured to transmit said transmission signal, wherein said modulation encoder comprises a signaling data modulation encoder configured to modulate and encode said signaling data by encoding said signaling data according to a predetermined code, performing a correlation of the encoded signaling data with a correlation sequence, modulating said correlated signaling data into signaling data patterns, and outputting said signaling patterns.

BRIEF DESCRIPTION OF THE DRAWINGS

These and other aspects of the present invention will be apparent from and explained in more detail below with reference to the embodiments described hereinafter. In the following drawings FIG. 13 shows a schematic diagram of a second embodiment of a second part of a signaling data decoder according to the present invention, FIG. 14 shows a diagram illustrating an embodiment of a frame structure for use with the invention.

DETAILED DESCRIPTION OF THE INVENTION

Figure 1:
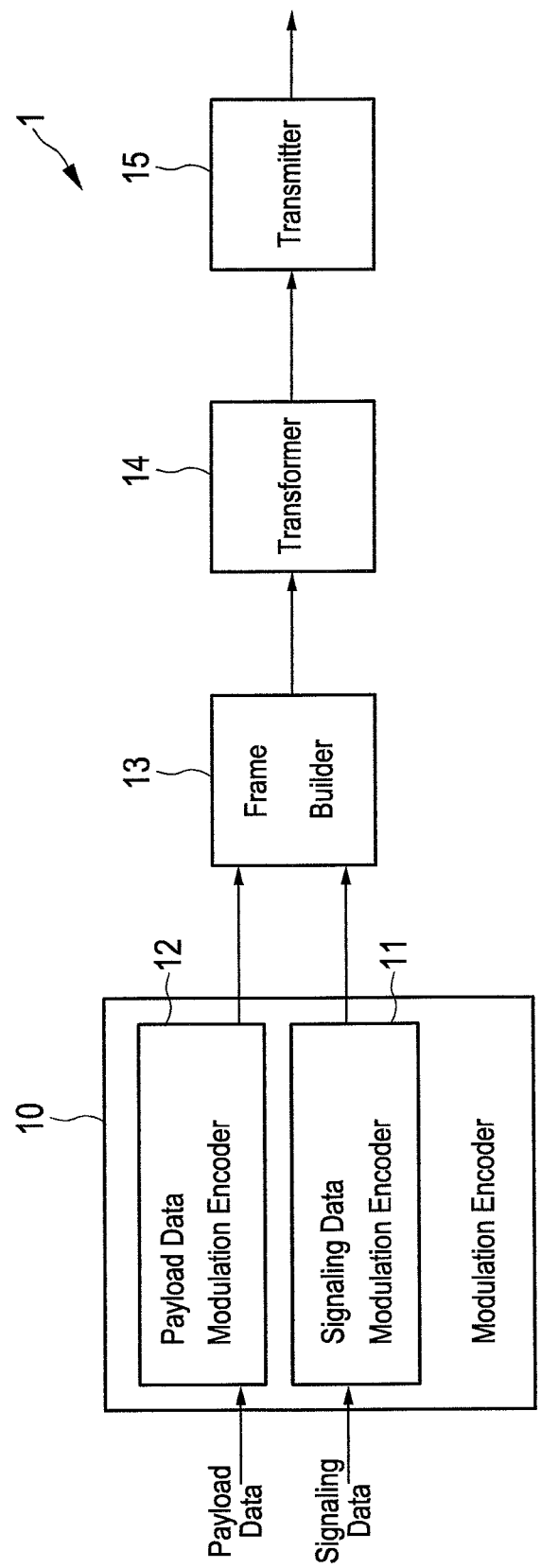
FIG. 1 shows a schematic diagram of the general layout of a transmitting apparatus according to the present invention.

FIG. 1 shows a schematic diagram of the general layout of a transmitting apparatus 1 for transmitting signals in a transmission system on the basis of a frame structure, the frames of said frame structure comprising signaling data and payload data according to the present invention. The transmitting apparatus 1 essentially comprises a modulation encoder 10 configured to separately modulate and encode said signaling data into signaling data patterns (by a signaling data modulation encoder 11) and said payload data into payload data patterns (by a payload data modulation encoder 12). The transmitting apparatus 1 further comprises a frame builder 13 configured to map the signaling data patterns and payload data patterns onto the frames of said frame structure of a transmission signal, wherein said signaling data patterns are split into n signaling data portions, n being a positive integer, which n signaling portions are mapped onto n or less frames as will be explained below. The obtained transmission signal is then provided to a transmitter 15 for transmission. Optionally, a transformer 14 is provided for transforming the obtained transmission signal, i.e. said at least one signaling pattern and said one or more data patterns, from the frequency domain into the time domain to generate a time domain transmission signal, which is then provided to the transmitter 15 for transmitting said time domain transmission signal. The transmission signal can then be transmitted through the transmission system, e.g. a broadcast system for mobile reception of broadcast signals (e.g. TV or audio broadcasting or other broadcast services), for reception by one or more receiving apparatus.

It shall be noted here that the transmitting apparatus may comprise further elements, e.g. as provided in a transmitting apparatus according to the DVB-T2 standard (as shown in FIG. 1 of the DVB-T2 standard). Such elements may include an input processing unit, a BICM (Bit Interleaved Coding & Modulation) unit (including the modulation encoder 10) and an OFDM generator (including the transformer 14).

Figure 2A:
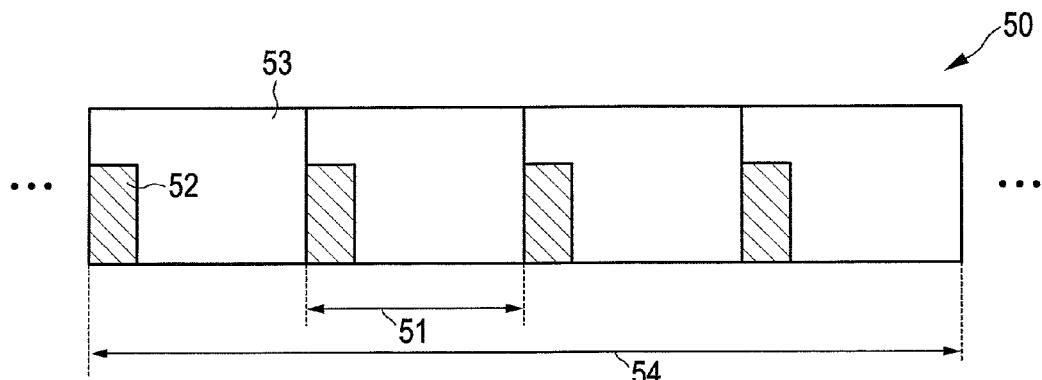
FIG. 2 shows diagrams illustrating the mapping of signaling data onto several frames as known and as proposed according to the present invention.

The mapping of signaling data onto several frames as known and as proposed according to the present invention shall be explained with reference to FIG. 2. FIG. 2A illustrates a frame structure 50 comprising subsequent frames 51, wherein all frames 51 comprise the same signaling data pattern 52, i.e. in each frame 51 the same signaling data pattern 52 is transmitted. The rest of each frame is available for mapping a payload data pattern 53, i.e. may carry actual payload, such as audio, video or other content data. In some frame structures, such as the frame structure in accordance with the DVB-T2 standard, a number of frames 51 (here four frames as a simple example) is seen as a set 54 (sometimes also called super-frame) of frames 51.

Figure 2B:
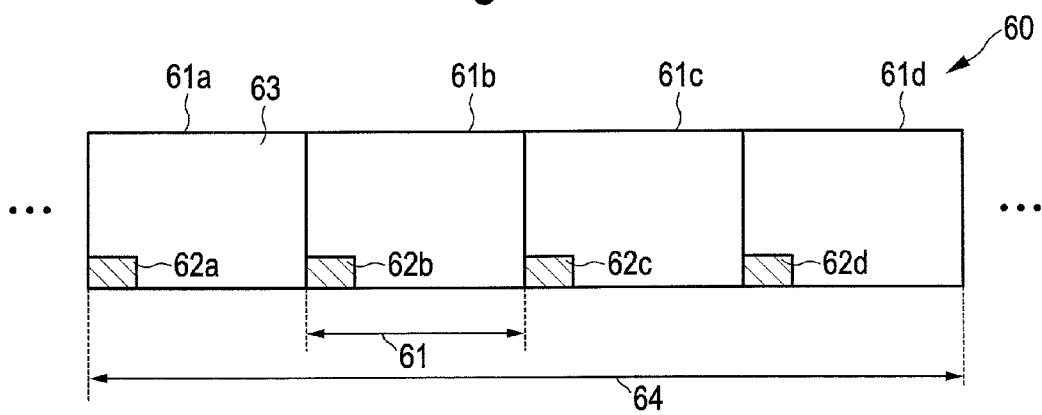

FIG. 2B illustrates a frame structure 60 as proposed according to the present invention. In this frame structure 60 each of a number of (preferably) subsequent frames 61, in particular each of the n (n=4 in this example) subsequent frames 61a, 61b, 61c, 61d forming a set 64 of frames, comprise only a signaling data portion 62a, 62b, 62c, 62d of a signaling data pattern. In other words, in each frame 61 the signaling data pattern (52 in FIG. 2A) which is conventionally mapped onto each frame, is split into n signaling data portions 62a, 62b, 62c, 62d, which are mapped onto the n subsequent frames 61a, 61b, 61c, 61d. This is particularly possible if (as is often the case) the signaling data are static (i.e. do not change often, e.g. in broadcast systems only change after weeks or even months).

Although this means that a receiving apparatus needs more time to receive all signaling data of a complete signaling data pattern, as is generally required, this saves transmission bandwidth since more space in each frame is available for mapping payload data patterns 64. Besides this increase of the efficiency of the transmission, a higher reliability of the reception is achieved due to the improved time diversity of the signaling data. These advantages are particularly important for mobile handheld receivers, e.g. as used in broadcast systems enabling mobile reception of broadcast services. In practical systems, a tradeoff will be made when selecting the number of n in order not to require too much time for the receiving apparatus for obtaining all signaling data portions for assembling a complete signaling data patterns (which would be the case for larger n) and to provide both a sufficient efficiency and time diversity.

Figure 3:
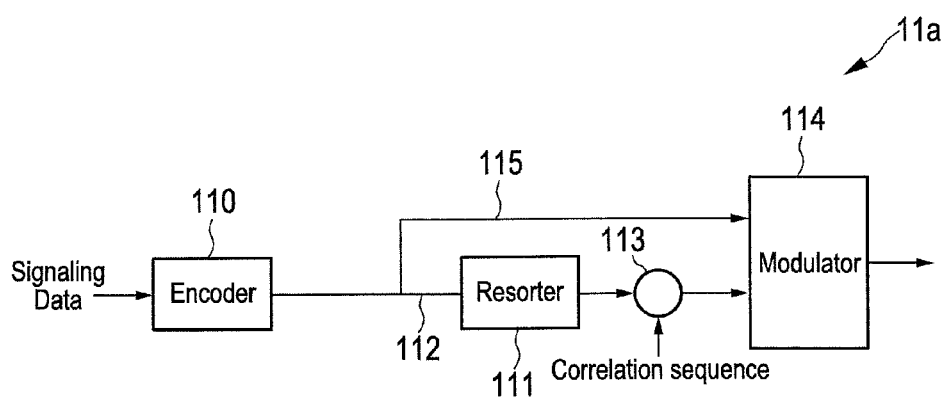
FIG. 3 shows a schematic diagram of a first embodiment of a signaling data modulation encoder according to the present invention.

FIG. 3 shows a schematic diagram of a first embodiment of a signaling data modulation encoder 11a according to the present invention for modulating and encoding the received signaling data. It comprises an encoding unit 110 configured to encode the received signaling data according to a predetermined code, e.g. a BCH code followed by an LDPC code. A resorting unit 111 is provided on a first path 112, e.g. a Q (quadrature) path of the encoded signaling data (also called the signaling data codewords), which is configured to resort said encoded signaling data. This resorting unit 111 may be a shifting unit for shifting the bits of the encoded signaling data, e.g. by one or two bits. A combining unit 113 is provided on said first path 112 which is configured to modulate a correlation sequence onto said resorted signaling data output from the resorting unit 111. This combining unit 113 may be an adder that adds modulo 2 or an XOR unit.

Finally, a modulation unit 114 is provided which is configured to modulate the output of the first path 112 and the output of a second path 115, e.g. an I (inphase) path of the encoded signaling data, said second path 115 having a different phase than the first path 112. I.e., the modulation unit 114 modulates the encoded signaling data provided on the second path 115 and the output of the combination unit 113. The modulation unit 114 may e.g. be a 16 QAM mapper or a QPSK mapper (or any other modulator that is appropriate or selected for the particular transmission system). The output of the modulation unit 114 represents the signaling data patterns which are subsequently mapped onto the frames 61 of the frame structure 60 as described above with respect to FIG. 2B.

It shall be noted that in other embodiments the signaling data modulation encoder comprises only some of the above mentioned elements, or the same elements in other constellations, or combinations with further elements.

Hence, according to an embodiment it is suggested to modulate the correlation sequence onto the signaling data. Further, it is suggested to feed the signaling data to an I and a Q path of the modulating unit 114 and to resort (i.e. to reorder) the data in the I or the Q path (for example by (cyclically) delaying it or by (cyclically) shifting it), while modulating the correlation sequence onto one of the paths. Hereby, more diversity of the signaling data is achieved which results in improved decoding properties on the receiving side. Preferably, a QPSK modulation is performed by the modulating unit 114 on the signaling data. A QPSK modulation is more robust than a 16 QAM modulation A QPSK symbol comprises 2 bits, whereby each symbol carries a part of a correlation sequence, which could for example be a PN sequence, a PRBS sequence or any other suitable sequence with good correlation properties.

In an embodiment, the encoding unit 110 is for example a concatenated BCH (Bose-Chaudhuri-Hocquenghem block code) and LDPC (Low Density Parity Check code) encoder which encodes the signaling data, which could for example be represented by 200 bits (for example the BCH/LDPC encoder could be a concatenated BCH/LDPC (200, 1840) encoder). The encoding unit 110 then outputs e.g. 1840 bits of encoded signaling data which are then fed to an I and a Q path of the modulating unit 114.

In the I path, the (e.g. 1840) encoded signaling bits are fed to the I path of the modulating unit 114 in unchanged form. However, in the Q path, the encoded signaling bits are resorted by any suitable resorting process, e.g. cyclically delayed (e.g. delayed by a one bit cyclic shift), shifted, reordered or the like, in a resorting unit 111. Thereafter, the correlation sequence (for example a PN sequence, a PRBS sequence any other suitable correlation sequence with good correlation properties) is modulated onto the resorted bits by means of a combining unit 113, which performs for example an XOR operation or any other suitable operation. The correlation sequence for example also comprises 1840 bits, so that in cases the resorting unit 111 introduces a one bit cyclic shift, each shifted bit of the Q path is modulated with one bit of the correlation sequence. The resorted bits with the modulated correlation sequence are then supplied on the Q path to the modulating unit 114, which performs e.g. a QPSK modulation on the signals supplied via the I and Q path.

The modulating unit 114 then outputs modulated signaling information in form of symbols (also called cells), in the present example 1840 symbols. Each symbol comprises a number of bits (in the QPSK example two bits), wherein, in the present example, one of the bits is modulated with one bit from the correlation sequence. Generally, a part of the correlation sequence is modulated onto one or more of the bits of each symbol. It has to be understood that instead of the Q path, the I path could be delayed and modulated with the correlation sequence. The modulated signaling data are then supplied from the modulating unit 114 to the frame builder 13 shown in FIG. 1 for mapping the signaling data onto the frames as explained above.

Figure 4:
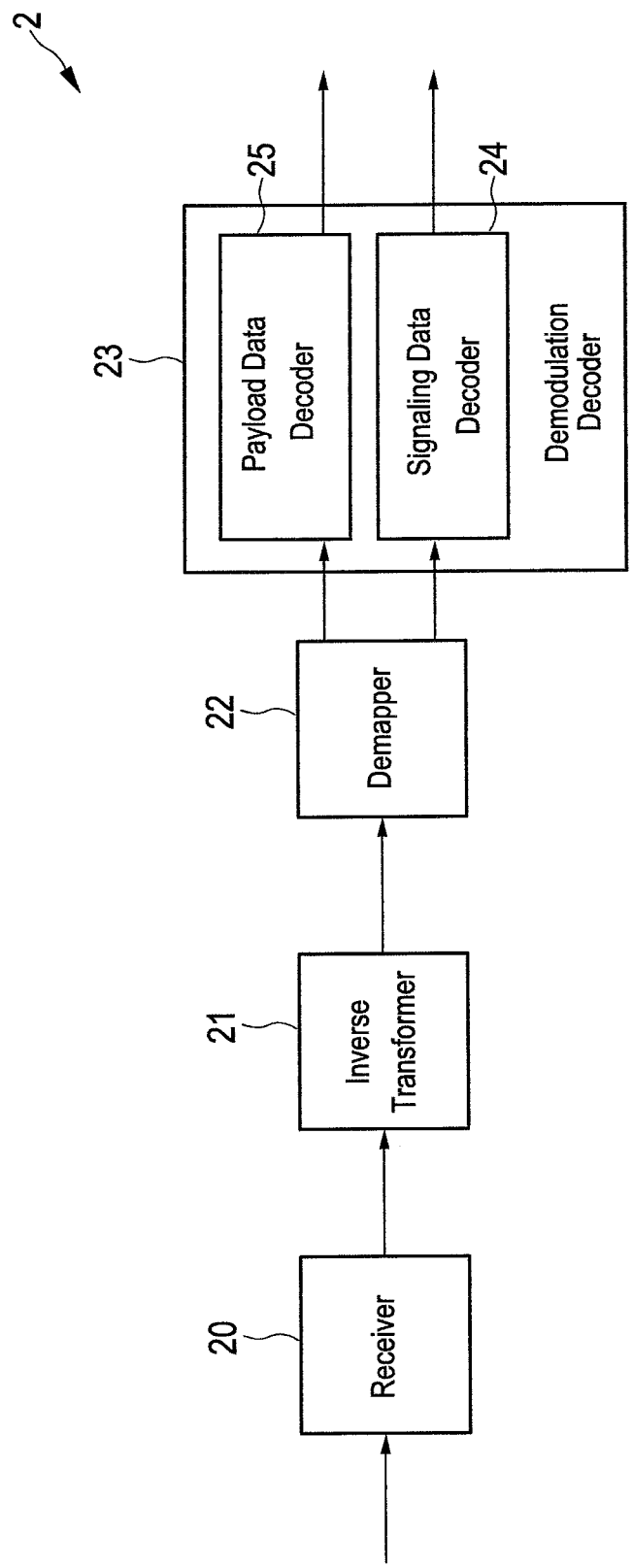
FIG. 4 shows a schematic diagram of the general layout of a receiving apparatus according to the present invention.

FIG. 4 shows a schematic diagram of the general layout of a receiving apparatus 2 according to the present invention. The receiving apparatus comprises a receiver 20 configured to receive a transmission signal. Optionally, an inverse transformer 21 is provided that is configured to transform said received time domain transmission signal from the time domain into the frequency domain to generate a frequency domain transmission signal. A frame demapper 22 is configured to demap signaling data blocks and payload data patterns from the frames of said frame structure of said transmission signal (e.g. the frequency domain transmission signal). Hereby, a signaling data block is assumed to comprise a number of data corresponding to the number of a signaling data pattern, wherein said signaling data patterns are split into n signaling data portions, n being a positive integer, which n signaling portions are mapped onto n or less frames. Thus, irrespective if the signaling data patterns are split into several portions or not, which the receiving apparatus does not yet know, the receiver initially assumes that the signaling data pattern is not split into several portions and takes a signaling data block whose length corresponds to the length of a signaling data pattern, and demaps said signaling data blocks from the frames of the frame structure.

The receiving apparatus further comprises a demodulation decoder 23 configured to separately demodulate and decode said signaling data blocks and payload data patterns to obtain signaling data and payload data, wherein said demodulation decoder 23 comprises a signaling data demodulation decoder 24 configured to demodulate and decode said signaling data blocks and a payload data demodulation decoder 25 configured to demodulate and decode the payload data from the frames. The demodulation and decoding of said signaling data blocks is performed by determining the number n from said signaling blocks by performing a correlation of the data included in one or more signaling data blocks with the correlation sequence, by which the signaling data have been correlated before transmission, and decoding n signaling portions included in the signaling blocks from which n has been determined. Preferably, the order of the n signaling data portions is also determined to enable the correct reconstruction of a signaling data pattern from the n signaling data portions.

It shall be noted here that the receiving apparatus may comprise further elements, e.g. as provided in a receiving apparatus according to the DVB-T2 standard. Such elements may include an input processing unit, a bit interleaved decoding & demodulation unit (including the demodulation decoder 23) and an OFDM demodulator (including the inverse transformer 21).

Figure 5:
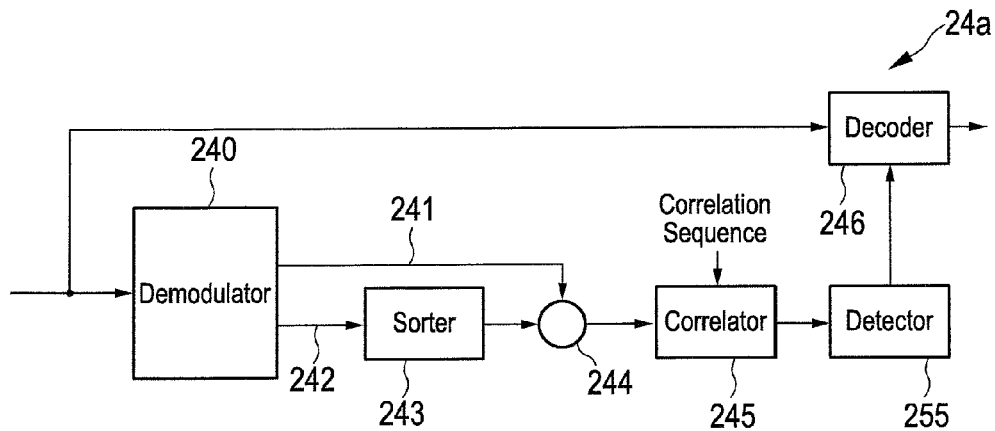
FIG. 5 shows a schematic diagram of a first embodiment of a first part of a signaling data decoder according to the present invention.

FIG. 5 shows a schematic diagram of a first embodiment of a first part of a signaling data decoder 24*a* according to the present invention. The signaling data decoder 24*a* comprises a demodulation unit 240 configured to demodulate encoded signaling data included in one or more signaling data blocks and to output the demodulated signaling data on a first path 242 (e.g. a Q path) and on a second path 241 (e.g. an I path) having a different phase than the first path. Further, the signaling data decoder 24*a* comprises a sorting unit 243 provided on the first path and configured to sort the demodulated signaling data, a combining unit 244 provided on the first path and configured to combine said demodulated signaling data of the second path with said resorted signaling data, a correlation unit 245 configured to correlate said combined signaling data with said correlation sequence, and a decoding unit 246 configured to decode said n signaling portions included in the signaling blocks from which n has been determined. Preferably, for detecting the value of n a separate detection unit 255 may be provided so that the decoding unit 246 receives both the input to the signaling data decoder 24*a*, i.e. encoded signaling data, and the output of the detection unit 255 providing information about the value of n.

In particular, FIG. 5 provides a suggestion for an implementation in order to obtain and evaluate the signaling data, e.g. contained in data frame headers, preambles or located at a predetermined position within a frame. Hereby, the received data stream is supplied to the demodulation unit 240, e.g. a demapping means, which is for example a soft decision (or hard decision) QPSK demapping means or a QAM demapping means, which demodulates the data and outputs them in an I and a Q path. Advantageously, the data are output in a log likelihood ratio form. In the Q path, the data are resorted (e.g. delayed, shifted or the like) in a sorting unit 243 in order to reverse the resorting introduced by the resorting unit 111 to the data in the Q path of the signaling data modulation encoder 11*a* shown in FIG. 3. Thereafter the data are modulated in the combining unit 244 with an expected copy (or suitably processed copy) of the correlation sequence comprised in the data frame headers (modulated onto the signaling data in the transmitting apparatus 1).

Preferably, the sorting performed by the sorting unit 243 should be fully reversible to the resorting introduced by the resorting 111. Also, the sorting unit 243 as well as the combining unit 244 should be located in the I path in case that the resorting unit 111 and the combining unit 113 are located in the I path.

Afterwards (as will be explained below in more detail with reference to FIGS. 7 and 13), the data of the I and the Q path are summed, whereafter decoding is performed to the added data in the decoder unit 252 (e.g. whereafter a hard decision is applied to the added data). The output is then decoded, for example by block code decoding which decodes the coding introduced by the encoding in the transmitting apparatus. The output of the decoding is then the original signaling data, as for example the 1840 bits signaling data as supplied to the encoding in the transmitting apparatus. These signaling data are then used for the further processing, for example supplied to the demapping means and/or error decoding means of the receiving apparatus. It should be noted that the I and the Q path could be decoded separately and the path with the better decoding result could be further used.

During the acquisition of the signaling data the receiver is first assuming n=1, performing a correlation with the known correlation sequence on the number of signaling data bits in a signaling data pattern (e.g. 1840) in the first received frame. If no correlation peak is detected the next higher value of n is assumed, waiting for the next frames to collect the required amount of signaling data portions. Then, the correlation is again performed as explained above with reference to FIG. 5. In contrast to the correlation solution of as provided e.g. in the DVB-C2 standard (DVB document A138, April 2009) the potential position in the framing structure is known, allowing for a complete reverse cyclic shift instead of a (e.g. two bit) delay, therefore avoiding the loss of the last (e.g. two) bits for the correlation.

Figure 6A:
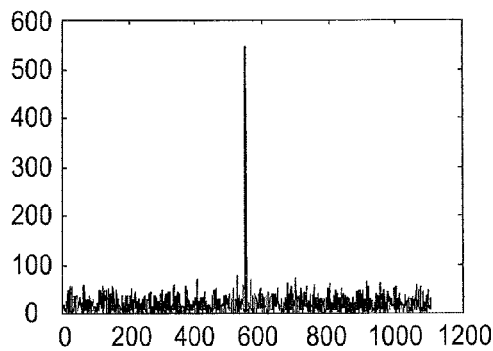
FIG. 6 shows diagrams illustrating the detection of the signaling portions by use of the correlation.
Figure 6B:
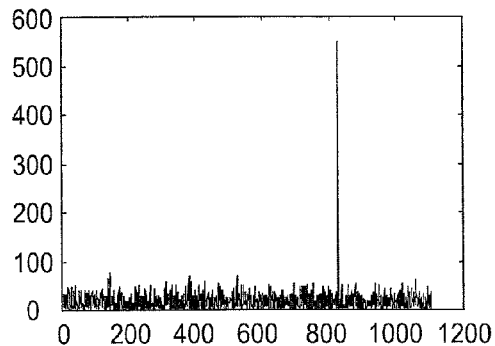

If a peak is present for a given n, it is possible to determine the order of the signaling data portions with the aid of the peak position of the correlator output (if a cyclic convolution was used for correlation). This means that only a single correlation is required for each possible value of n. This is exemplarily shown in FIG. 6 showing diagrams illustrating the detection of the signaling portions by use of the correlation applied according to the present invention. In the diagram shown in FIG. 6A the peak occurs at an index of 552, which is two times the signaling data portion length for n=4 and a signaling data pattern length of 1104. In the diagram shown in FIG. 6B the peak occurs at an index of 828, which is three times the signaling data portion length for n=4 and a signaling data pattern length of 1104. Therefore the signaling data portions must be shifted by two for successful (e.g. LDPC) decoding. The reliability of the detection can easily be achieved by means of the amplitude of the peak in connection with a defined threshold. Furthermore, the peak must arise at a position which is a multiple of the signaling data portion length allowing for more sophisticated peak detection algorithms.

Figure 7:
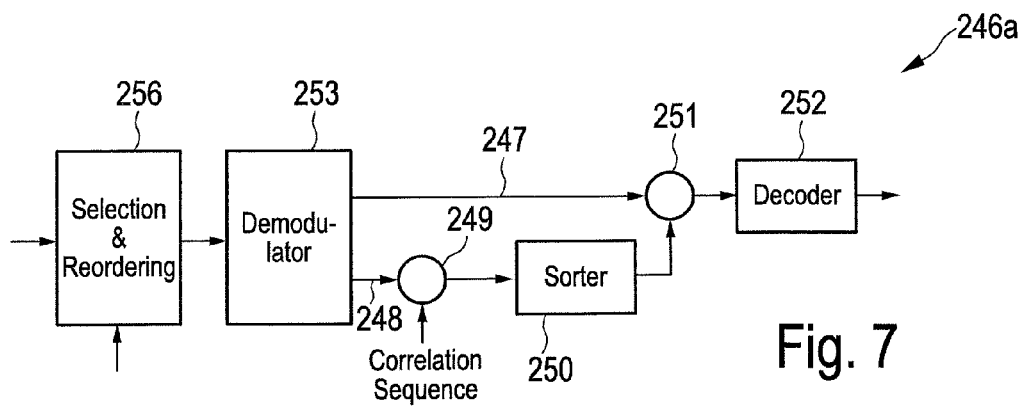
FIG. 7 shows a schematic diagram of an embodiment of a second part of a signaling data decoder according to the present invention.

After successful detection of n and, preferably (as will be explained below in a further embodiment), the correct order of signaling data portions, the content information of the signaling data portions is retrieved. For this purpose the signaling data decoder 24 (as shown in FIG. 4) comprises a second decoder part coupled to the first decoder part 24a (as shown in FIG. 5). An embodiment of second decoder part 246a is shown in FIG. 7. The output of the detection unit 255 and the input of the demodulation unit 240 are provided to selection and reordering unit 256. In said selection and reordering unit 256 the real signaling information is selected from the encoded signaling data, i.e. the detected number n of signaling data portions are taken (all other received data from the originally taken signaling data blocks is dismissed) and reordered in the correct sequence so that the original signaling data patterns are finally reconstructed. These reconstructed signaling data patterns are then provided to a decoder demodulation unit 253. In said decoder demodulation unit 253 a demodulation, e.g. a QPSK or 16 QAM demapping, is performed resulting in two paths 247, 248, e.g. an I path 247 and a Q path 248. For highest robustness, in a decoder decorrelation unit 249 the correlation sequence is removed by correlating the signal output of the decoder demodulation unit 253 on the first path 248 with the same correlation sequence that is used in the modulation encoder 11a. Subsequently, the reordering performed in the first path 112 in the modulation encoder 11a, in particular in the resorting unit 111 (shown in FIG. 3), is removed by an decoder sorting unit 250. Then, the output of the decoder demodulation unit 263 on the second path 247, which e.g. comprises the LLRs (Log Likelihood Ratios) of the I path, and the output of the decoder sorting unit 250, which e.g. comprises the LLRs of the Q path, are added in an decoder combining unit 251, e.g. an addition unit. Finally, in a signaling data decoding unit 252 decoding (e.g. LDPC decoding, followed by BCH decoding) of the corresponding bits output by the decoder combining unit 251 is performed. Due to the addition (e.g. LLR combining) the applied demodulation (e.g. QPSK demodulation) offers a higher robustness as a BPSK signal, as both output paths 247, 248 (e.g. I and Q paths) of the decoder demodulation unit 253 are carrying the actual signaling data and thus increase the diversity order.

Figures 8A, 8B:
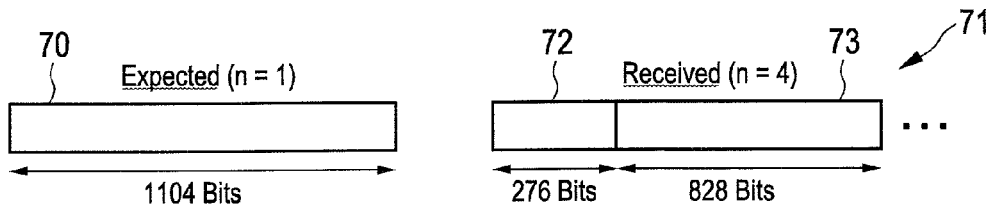
FIG. 8 illustrates how a receiving apparatus expects and receives the signaling data.

Referring to FIG. 6, even if n=1 is assumed in the receiver, a peak could occur if a signaling data pattern is transmitted in several portions. This is shown in FIG. 8 exemplary for a signaling data pattern length L of 1104 bits. The receiver is expecting the transmission of all 1104 signaling data pattern bits 70 within one frame (n=1) (i.e. said it takes a signaling data block 70 of the size of a signaling data pattern) as shown in FIG. 8A. But even though the signaling data pattern 70 is split to four signaling data portions mapped onto four frames (n=4), one fourth of the received sequence 71 (as shown in FIG. 8B comprising a signaling data portion 72 and a payload data portion 73) matches the correlation sequence, resulting in a peak with reduced amplitude at the receiver. Depending on the number of the signaling data portion this peak may occur at the same position as it would occur for n=1. This means that the receiver is not able to detect the value of n unambiguously with this approach.

A possible solution is the use of an individual correlation sequence for every value of n. However, this leads to some drawbacks, like the need for storing all these correlation sequences in the receiver. Furthermore, it is required to perform correlations with all used correlation sequences to determine the used value of n.

Figure 9:
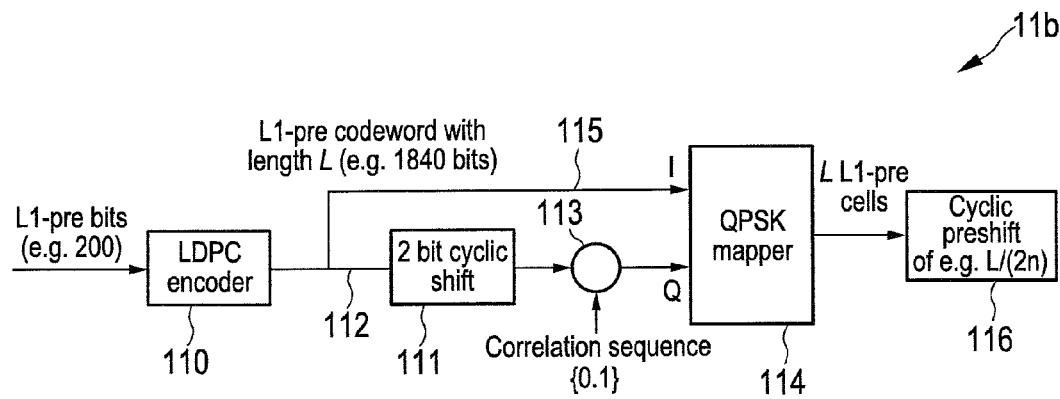
FIG. 9 shows a schematic diagram of a second embodiment of a signaling data modulation encoder according to the present invention.

To overcome these drawbacks a cyclical preshift of the output of the modulation unit 114 (see FIG. 3), i.e. of the signaling data patterns depending on n is introduced. An embodiment of a corresponding signaling data modulation encoder 11b is shown in FIG. 9. This embodiment generally comprises the same elements as the signaling data modulation encoder 11b, but additionally comprises a preshifting unit 116. Furthermore, in FIG. 9 the embodiment is shown for a particular implementation in which the signaling data pattern is provided for including L1-pre bits as e.g. used in accordance with the DVB-T2 standard. However, the same embodiment may also be used in other implementations, and the preshifting unit 116 may simply be added to the embodiment of the signaling data modulation encoder 11a shown in FIG. 3.

Figure 10:
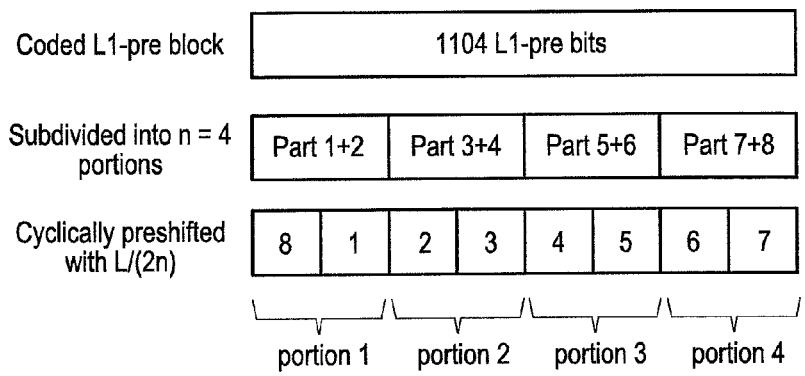
FIG. 10 shows a diagram illustrating cyclic pre-shifting of the content of the signaling pattern.
Figure 11A:
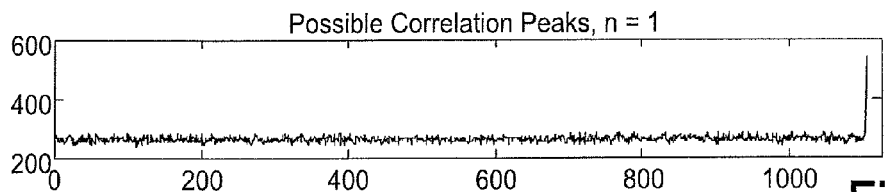
FIG. 11 shows diagrams illustrating possible peak positions of the correlation peaks for different splittings of the signaling patterns with cyclic pre-shifting.
Figure 11B:
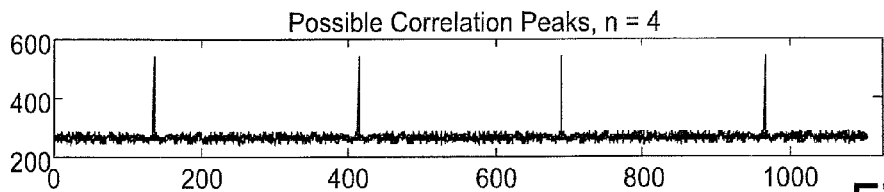
Figure 11C:
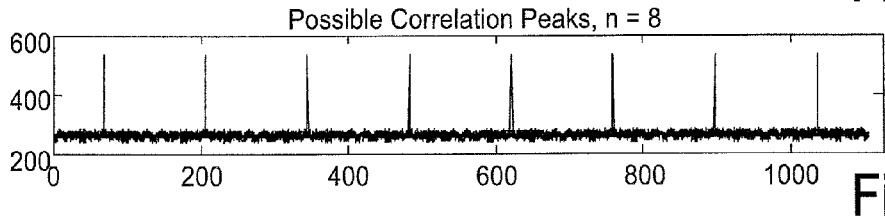

For n=1 no preshifting is used in the preshifting unit 116, whereas for n>1 a preshifting by L/(2n) with the coded L1-pre length L is introduced. For example with an L1-pre signaling length L=1104 and n=4, the contents of the L1-pre portions are cyclically shifted by 1104/8=138 cells. The corresponding structure of the L1-pre block is shown in FIG. 10. This preshifting allows for the unambiguous detection of n in the receiver with the aid of the peak position of the correlation. FIG. 11 depicts the possible peak positions for the former example with n=1 (FIG. 11A), n=4 (FIG. 11B), and n=8 (FIG. 11C). This allows for the detection of n in a single frame with only one correlation of length L. With the proposed shifting the n possible peak positions can be calculated by $$Peakpos(k) = k\frac{L}{n} + \frac{L}{2n}, k \in \{0, \ldots, n-1\}.$$

The second term which is not dependent on k ensures the unique peak positions for any value of k and n. However, the usage of different values for the cyclic shifting is also possible.

As L1-pre is the initial signaling stage which is accessed first in a frame a signaling of n is not possible in case of a subdivision to multiple portions and "n-periodic" transmission (meaning the proposed concept of the splitting of the signaling data patterns into n signaling data portions). This means that the value of n and the order of the n L1-pre portions have to be determined during the acquisition stage. To ease this detection a reduced amount of values for n can be defined for transmission, e.g. 1, 4 and 8. With increasing n an increase of the code rate of L1-pre is possible due to additional time diversity which reduces the protection overhead. Whereas L1-pre needs 1840 cells in T2 with code rate 1/5, code rate 1/3 is sufficient for n=8 in typical mobile channels, reducing the amount of overall L1-pre cells to 1104.

However, to ease the detection of the used value of n, and furthermore allowing for the detection of the correct order of the proportion, L1-pre is linked with a correlation sequence with the length L of the L1-pre signaling field. This is done as depicted in FIG. 9: The L1-pre signaling is transmitted in the I-axis of QPSK cells, but also in a modified form after correlation (XOR-connected) in the Q-axis allowing for a correlation in the receiver. A two bit cyclic shift allows for a decoupling of I and Q axis in the transmitter, decreasing the probability of an erasure of both I and Q axis after frequency- and time interleaving. However, any other reordering which is transparent to the receiver could be used instead of a bitshift, e.g. a bit interleaver.

Figure 12A:
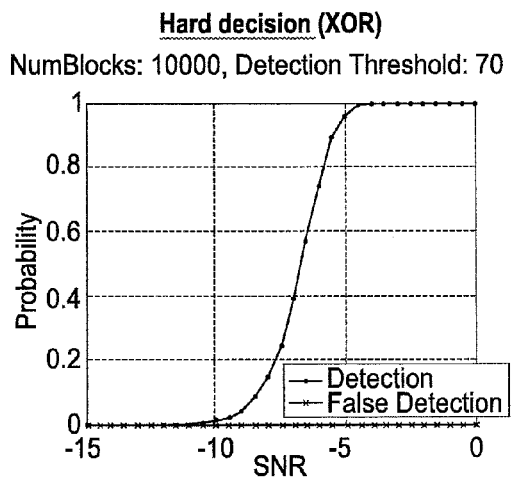
FIG. 12 shows diagrams illustrating the performance of the correlation.
Figure 12B:
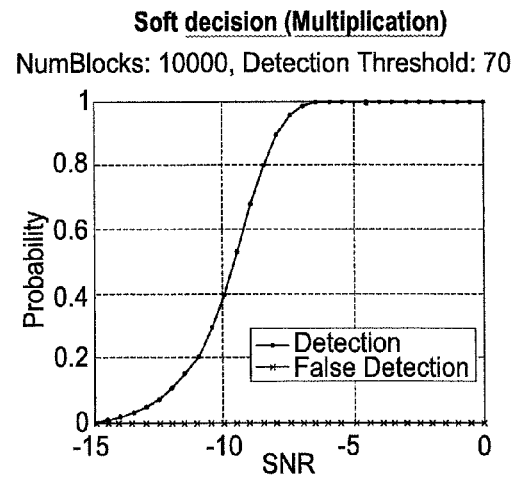

For typical preamble lengths the correlation shows a very reliably detection performance. This is depicted in FIG. 12 for a correlation with soft decision LLR values of a QAM demapper (FIG. 12B) and hard decided bit values (FIG. 12A). Even with hard decision the correlation shows a detection probability of 100% at an SNR (Signal-toNoise Ratio) of −4 dB in the AWGN (Additive White Gaussian Noise) channel. Furthermore, a robustness increase is possible by utilizing the knowledge of the allowed peak positions if a limitation to particular values of n is introduced.

FIG. 13 shows a second embodiment of a second part of a signaling data modulation decoder 246b according to the present invention. This embodiment is quite similar to the embodiment of the second part of the signaling data modulation decoder 246a shown in FIG. 7 but additionally comprises an unshifting unit 254. Furthermore, quite similar as mentioned above for FIG. 9, the embodiment is shown for a particular implementation in which the signaling data pattern is provided for including L1-pre bits as e.g. used in accordance with the DVB-T2 standard. However, the same embodiment may also be used in other implementations, and the unshifting unit 254 may simply be added to the embodiment of the signaling data modulation decoder 246a shown in FIG. 7. By this unshifting unit 254 the shifting introduced by the preshifting unit 116 (e.g. by L/2n) is removed again.

It shall be noted that in other embodiments the signaling data modulation decoders as shown in FIGS. 5, 7 and 13 comprise only some of the above mentioned elements, or the same elements in other constellations, or combinations with further elements.

With respect to the selection of the correlation sequence it is to be mentioned that it is meaningful to select the correlation sequence according to the autocorrelation properties of the sequence. For long sequences the selection is not so critical, as the amplitude of the correlation peak (which is constant for a given correlation length) is clearly stronger than the noise floor of the correlation. Nevertheless, in principle sequences without long subsequences of zeros or ones show good correlation performance. These sequences can be generated by means of a linear feedback shift register (LFSR) with a polynomial with maximal-length (so called maximum length sequences). The length of the LFSR is selected according to the lowest number of states exceeding the required correlation length. For example for the generation of a correlation sequence with a length of 1840 bits the output of an LFSR with 11 bits and therefore $2^{11}-1=2047$ states is used.

Another advantage is that such a sequence can be generated in the receiver by means of an LFSR without the need to store it in a non-volatile memory.

Figure 15:
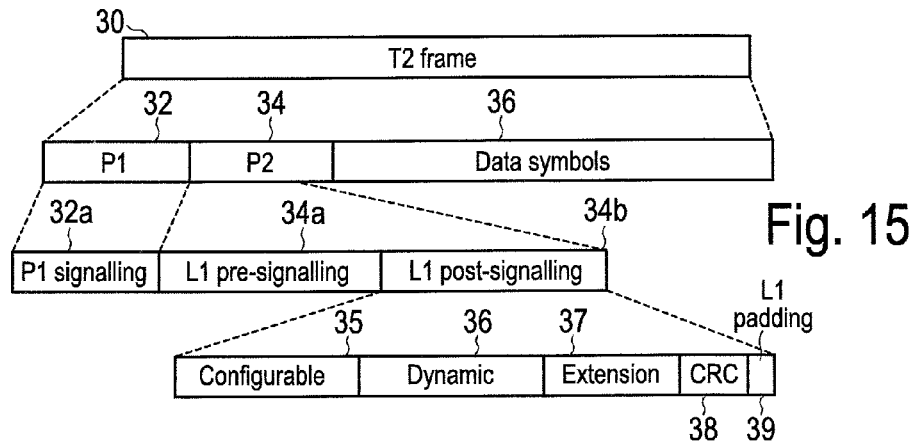
FIG. 15 shows a diagram illustrating the structure of a frame as used in the frame structure illustrated in FIG. 14.

FIGS. 14 and 15 show a frame structure as used in broadcast systems in accordance with the DVB-T2 standard. In particular, according to DVB-T2, a superframe structure is applied where each superframe is subdivided into a multitude of T2 frames. After each predetermined number of consecutive T2 frames an FEF part (Future Extension Frame part) is inserted for future use. The present invention can generally be applied to the T2 frames, i.e. a signaling data pattern can be split into a number of signaling data portions corresponding to the number of T2 frames included in a superframe wherein each signaling data portion of a particular signaling data pattern is mapped onto one T2 frame of the superframe.

In another embodiment, the present invention uses the FEF parts (which may also be regarded as frames). For instance, a signaling data pattern can be split into a number of signaling data portions corresponding to the number of FEF parts included in a superframe wherein each signaling data portion of a particular signaling data pattern is mapped onto one or more FEF parts of the superframe.

In still another embodiment, the present invention uses frames across the borders of a superframe, e.g. a number of FEF parts of two or more subsequent superframes.

As shown in FIG. 15, the DVB-T2 frame 30 includes a P1 symbol 32 and a P2 symbol 34 as well as other OFDM symbols 36 for carrying data. The P1 symbol 32 includes P1 signalling data 32a whereas the P2 symbol 34 includes in two parts L1 signalling data which is provided in a L1-pre signal 34a and a L1-post signal 34b. The L1 post signalling data is shown to provide several data fields including configurable data 35 (L1-config), a dynamic field 36 (L1-dynamic), an extension field 37 and a cyclic redundancy check field 38 as well as padding symbols 39.

Figure 16:
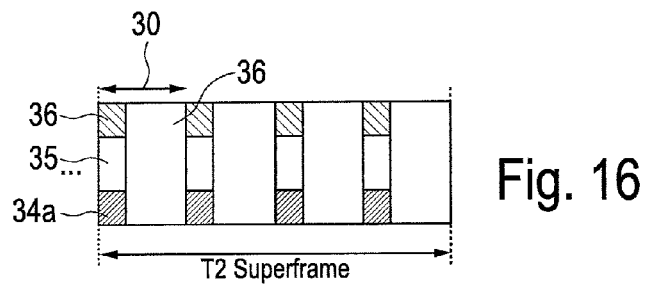
FIG. 16 shows a diagram illustrating the known mapping of signaling data onto frames as shown in FIG. 15.

The signaling according to DVB-T2 contains many signaling fields which are static during the transmission. For instance, the contents of L1-pre 34a and L1-config 35 can only change per superframe, which typically consists of several T2 frames. Conventionally the signaling data are mapped onto the frames as shown in FIG. 16, i.e. the same signaling data are mapped onto all frames of a superframe, even if they are static.

Figure 17:
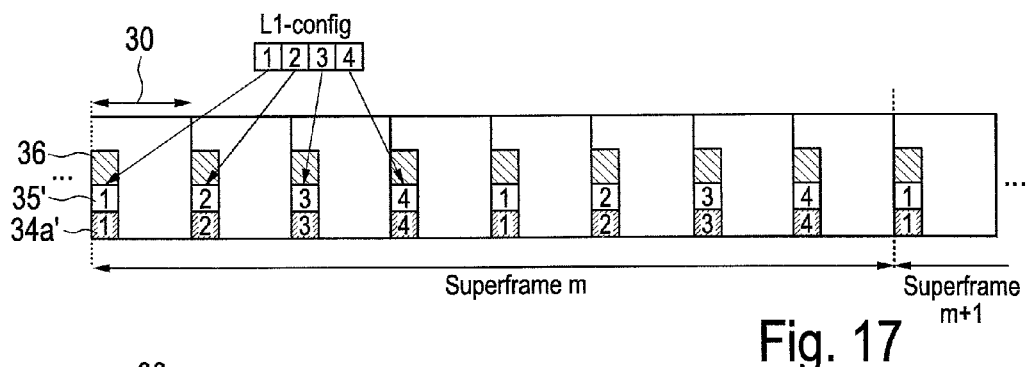
FIG. 17 shows a diagram illustrating a first embodiment of the mapping of signaling data onto frames as shown in FIG. 15.
Figure 18:
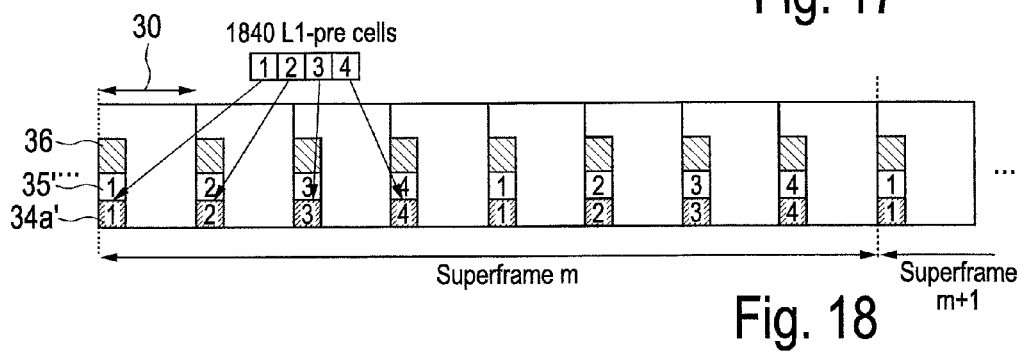
FIG. 18 shows a diagram illustrating a second embodiment of the mapping of signaling data onto frames as shown in FIG. 15.

However, it is possible to split these static signaling fields to n T2-frames to reduce the signaling overhead and to increase the robustness by means of additional time diversity. For example, the L1-config signaling 35' may be split to n=4 T2-frames (as shown in FIG. 17) with each proportion having only one fourth of the length of the complete L1-config block. Similarly, as shown in FIG. 18, the L1-pre signaling 34a' may be split to n=4 T2-frames with each proportion having only one fourth of the length of the complete L1-pre block.

The repetition rate n of L1-config (and/or L1-pre) can be signaled in the initial signaling stage L1-pre and does therefore not require further support for successful decoding, as the order of the proportions can be calculated from the frame number in the superframe. Hence a reconstruction of the complete L1-config field from the four L1-config portions can easily be achieved. However, the L1-dynamic field, which contains signaling data that may change every T2-frame, requires a transmission in every frame.

In the following further embodiments of the transmitting apparatus shall be explained. The transmitting apparatus is generally configured for transmitting signals in a transmission system on the basis of a frame structure, the frames of said frame structure comprising signaling data and payload data, said transmitting apparatus comprising a modulation encoder configured to separately modulate and encode said signaling data into signaling data patterns and said payload data into payload data patterns, a frame builder configured to map the signaling data patterns and payload data patterns onto the frames of said frame structure of a transmission signal, wherein said signaling data patterns are split into n signaling data portions, n being a positive integer, which n signaling portions are mapped onto n or less frames, and a transmitter configured to transmit said transmission signal, wherein said modulation encoder comprises a signaling data modulation encoder configured to modulate and encode said signaling data by encoding said signaling data according to a predetermined code, performing a correlation of the encoded signaling data with a correlation sequence, modulating said correlated signaling data into signaling data patterns, and outputting said signaling patterns.

In an embodiment said signaling data modulation encoder comprises
i) an encoding unit configured to encode said signaling data according to a predetermined code,
ii) a resorting unit provided on a first path of the encoded signaling data and configured to resort said encoded signaling data,
iii) a combining unit provided on the first path and configured to modulate a correlation sequence onto said resorted signaling data, and
iv) a modulation unit configured to modulate the encoded signaling data provided on a second path having a different phase than the first path and the output of the first path and to output said signaling data patterns.

In an embodiment said signaling data modulation encoder further comprises a shifting unit configured to shift, in particular to cyclically shift, the cells of said signaling data patterns by a shift factor.

In an embodiment said shifting unit is configured to shift the L cells of said signaling data patterns by a shift factor in the range between 0 and L/n or a multiple thereof, in particular by a shift factor of L/(2n).

In an embodiment said shifting unit is configured to shift the L cells of said signaling data patterns provided for being mapped onto n frames by a shift factor of L/(2n) or an odd multiple thereof.

In an embodiment said resorting unit is configured to shift the bits of the encoded signaling data received on the first path by a resorting factor.

In an embodiment said resorting unit is configured to shift the bits of the encoded signaling data received on the first path by a resorting factor of m bits, m being a positive integer, in particular by a resorting factor of m=1 or m=2.

In an embodiment said combining unit is configured to use a stored correlation sequence or a correlation sequence calculated based on a predetermined rule for modulation onto said resorted signaling data.

In an embodiment said combining unit is configured to use a correlation sequence having the same or smaller length than said encoded and resorted signaling data on said first path.

In an embodiment said frame builder is configured to map said signaling data patterns and said payload data patterns onto the frames of a frame structure, wherein the signaling data include L1-pre signaling data and L1-post signaling data including L1-config signaling data, and wherein the frame builder is configured to split the encoded and modulated L1-pre signaling data into n L1-pre signaling data portions and/or to split the encoded and modulated L1-config signaling data into n L1-config signaling data portions.

In an embodiment said frame builder is configured to map said signaling data patterns and said payload data patterns onto the n or more frames of a super-frame of the frame structure.

In an embodiment said transmitting apparatus is configured for transmitting signals in a multi-carrier communication system, in particular an OFDM-based broadcast system.

In an embodiment said signaling data modulation encoder is configured to use a lower code rate if n is smaller, whereas said signaling data modulation encoder is configured to use a higher code rate if n is higher.

In an embodiment said first path is a quadrature phase path, Q-path, and wherein said second path is an inphase path, I-path.

In an embodiment a transformer is provided that is configured to transform said signaling patterns and said data patterns from the frequency domain into the time domain to generate a time domain transmission signal for transmission by said transmitter.

The invention has been illustrated and described in detail in the drawings and foregoing description, but such illustration and description are to be considered illustrative or exemplary and not restrictive. The invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable non-transitory medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. A receiving apparatus for receiving signals in a transmission system, said signals being transmitted on the basis of a frame structure, the frames of said frame structure comprising signaling data and payload data, said receiving apparatus comprising:
    a receiver configured to receive a transmission signal,
    a frame demapper configured to demap signaling data blocks and payload data patterns from the frames of said frame structure of said received transmission signal, wherein a signaling data block includes signaling data portions of a signaling data pattern and wherein signaling data patterns are split into n signaling data portions, n being a positive integer and wherein n signaling data portions are mapped onto n or less frames, and
    a demodulation decoder configured to separately demodulate and decode said signaling data blocks and payload data patterns to obtain signaling data and payload data, wherein said demodulation decoder comprises a signaling data demodulation decoder configured to demodulate and decode said signaling data blocks by
        determining the number n from said signaling blocks by performing a correlation of the data included in one or more signaling data blocks with a correlation sequence, the correlation sequence by which the signaling data have been modulated before transmission, and decoding n signaling portions included in the signaling blocks from which n has been determined.

2. The receiving apparatus as claimed in claim 1,
wherein said signaling data demodulation decoder is configured to iteratively determine the number n from said signaling blocks by first performing a correlation of the data included in a first number of signaling data blocks with said correlation sequence, checking for the presence of a correlation peak and iteratively increasing the number of signaling data blocks with which the correlation is performed until a correlation peak is detected.

3. The receiving apparatus as claimed in claim 1,
wherein said signaling data demodulation decoder is configured to iteratively determine the number n from said signaling blocks by first performing a correlation of the data included in a single signaling data block with the correlation sequence, checking for the presence of a correlation peak and iteratively increasing the number of signaling data blocks, with which the correlation is performed until a correlation peak is detected, by a small number, in particular by one or two.

4. The receiving apparatus as claimed in claim 1,
wherein said signaling data demodulation decoder comprises
i) a demodulation unit configured to demodulate encoded signaling data included in one or more signaling data blocks and to output the demodulated signaling data on a first path and on a second path having a different phase than the first path,
ii) a sorting unit provided on the first path and configured to sort the demodulated signaling data,
iii) a combining unit provided on the first path and configured to combine said demodulated signaling data of the second path with said resorted signaling data,
iv) a correlation unit configured to correlate said combined signaling data with said correlation sequence,
v) a detection unit configured to determine the value of n, and
vi) a decoding unit configured to decode said n signaling portions included in the signaling blocks from which n has been determined.

5. The receiving apparatus as claimed in claim 4,
wherein said decoding unit comprises
a) a selection and reordering unit configured to select the n signaling data portions included in the signaling blocks from which n has been determined and to arrange them in the correct sequence to form said signaling data pattern,
b) a decoder demodulation unit configured to demodulate said signaling data pattern and to output the demodulated signaling data on a first decoder path and on a second decoder path having a different phase than the first decoder path,
c) a decoder decorrelation unit provided on the first decoder path and configured to decorrelate said demodulated signaling data with said correlation sequence,
d) a decoder sorting unit provided on the first decoder path and configured to sort the decorrelated signaling data,
e) a decoder combining unit configured to combine said demodulated signaling data of the second path with said decorrelated signaling data, and
f) a signaling data decoding unit configured to decode said n signaling portions included in the combined signaling data based on a predetermined code, based on which the signaling data have been encoded before transmission.

6. The receiving apparatus as claimed in claim 1,
wherein said signaling data demodulation decoder further comprises an unshifting unit configured to shift, in particular to cyclically shift, the n signaling portions included in the signaling blocks from which n has been determined by a shift factor, which has been used for shifting cells of said signaling data patterns before transmission.

7. The receiving apparatus as claimed in claim 6,
wherein said unshifting unit is configured to shift the L cells of said n signaling portions included in the signaling blocks from which n has been determined by a shift factor in the range between 0 and L/n or a multiple thereof, in particular by a shift factor of L/(2n).

8. The receiving apparatus as claimed in claim 7,
wherein said unshifting unit is configured to shift the L cells of said n signaling data portions included in the signaling blocks from which n has been determined by a shift factor of L/(2n) or an odd multiple thereof.

9. The receiving apparatus as claimed in claim 4,
wherein said sorting unit is configured to shift the bits of the demodulated signaling data by a sorting factor corresponding to the resorting factor used in a transmitting apparatus for sorting the bits the bits of encoded signaling data.

10. The receiving apparatus as claimed in claim 9,
wherein said sorting unit is configured to shift the bits of the demodulated signaling data by a sorting factor of m bits, m being a positive integer, in particular by a sorting factor of m=1 or m=2.

11. The receiving apparatus as claimed in claim 5,
wherein said decoder sorting unit is configured to shift the bits of the decorrelated signaling data by a sorting factor corresponding to the resorting factor used in a transmitting apparatus for sorting the bits the bits of encoded signaling data.

12. The receiving apparatus as claimed in claim 11,
wherein said sorting unit is configured to shift the bits of the decorrelated signaling data by a sorting factor of m bits, m being a positive integer, in particular by a sorting factor of m=1 or m=2.

13. The receiving apparatus as claimed in claim 4,
wherein said correlation unit and said decoder decorrelation unit are configured to use a stored correlation sequence or a correlation sequence calculated based on a predetermined rule.

14. The receiving apparatus as claimed in claim 4,
wherein said correlation unit and said decoder decorrelation unit are configured to use a correlation sequence having the same or smaller length than said encoded signaling data.

15. The receiving apparatus as claimed in claim 1,
wherein said frame demapper is configured to demap signaling data blocks and payload data patterns from the frames of said frame structure, wherein the signaling data include L1-pre signaling data and L1-post signaling data including L1-config signaling data and wherein the encoded and modulated L1-pre signaling data are split into n L1-pre signaling data portions and/or the encoded and modulated L1-config signaling data are split into n L1-config signaling data portions.

16. The receiving apparatus as claimed in claim 1,
wherein said frame demapper is configured to demap said signaling data blocks and payload data patterns from the n or more frames of a super-frame of the frame structure.

17. The receiving apparatus as claimed in claim 1,
wherein said receiving apparatus is configured for receiving signals in a multi-carrier communication system, in particular an OFDM-based broadcast system.

18. The receiving apparatus as claimed in claim 4,
wherein said first path and/or said first decoder path is a quadrature phase path, Q-path, and wherein said second path and/or said second decoder path is an inphase path, I-path.

19. The receiving apparatus as claimed in claim 1,
further comprising an inverse transformer configured to transform said received transmission signal from the time domain into the frequency domain to generate a frequency domain transmission signal for processing by said frame demapper.

20. A receiving method for receiving signals in a transmission system, said signals being transmitted on the basis of a frame structure, the frames of said frame structure comprising signaling data and payload data, said receiving method comprising:

receiving a transmission signal, demapping signaling data blocks and payload data patterns from the frames of said frame structure of said received transmission signal, wherein a signaling data block includes signaling data portions of a signaling data pattern and wherein signaling data patterns are split into n signaling data portions, n being a positive integer and wherein n signaling portions are mapped onto n or less frames, and separately demodulating and decoding said signaling data blocks and payload data patterns to obtain signaling data and payload data, including determining the number n from said signaling blocks by performing a correlation of the data included in one or more signaling data blocks with a correlation sequence, the correlation sequence by which the signaling data have been modulated before transmission, and decoding n signaling portions included in the signaling blocks from which n has been determined.

\* \* \* \* \*